Patented Apr. 2, 1946

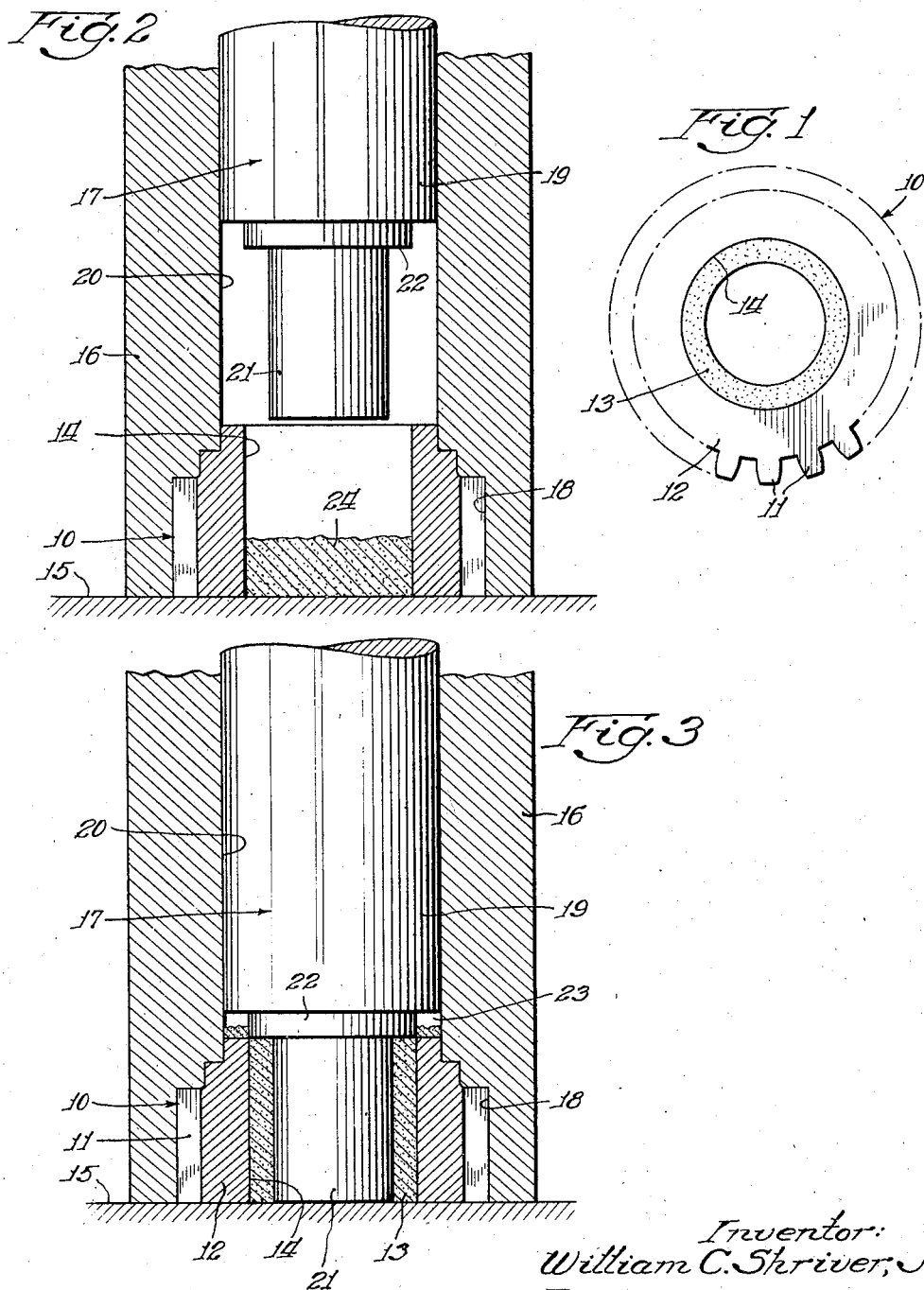

2,397,626

UNITED STATES PATENT OFFICE 2,397,626

METHOD OF MAKING A BUSHING

William C. Shriver, Jr., Huntington, Ind., assignor to Borg-Warner Corporation, Chicago, Ill., a corporation of Illinois Application October 12, 1942, Serial No. 461,706

1 Claim. (Cl. 18—59)

This invention relates to a method of forming a rotatable machine element having a molded plastic bushing.

There has been devised a bushing of an anti-friction material the principal constituents of which are non-metallic, for use in the hubs of gears, pulleys and the like, the primary purpose of such a bushing being to provide a substitute for bronze bushings commonly used in similar locations, and the non-metallic bushing must, of course, withstand the same treatment when in use as the bronze bushing. Such a bushing is disclosed in the application for Letters Patent of Ernest F. Davis, Serial No. 437,793, filed April 6, 1942, and entitled "Anti-friction material." As disclosed in this application, such a bushing may be made of a material which is a mixture of a thermo-setting plastic such as "Bakelite," and a lubricant such as lead, with the quantity of plastic in the mixture by volume being substantially greater than the quantity of lubricant and with the lubricant being in the form of finely divided particles whereby the bushing is comprised of a body of plastic in which is dispersed particles of lubricant substance. Where increased strength is desired, a binder or filler of fibrous material such as thread or asbestos may be added to the mixture. It has been found that such a bushing has superior anti-friction qualities, particularly as regards constancy of the coefficient of friction. It is difficult however to insert such bushings into a gear or other machine element with the technique normally used in forcing bronze bushings into similar machine elements since the latter can withstand considerable pressure and pounding while the thermo-setting plastic, in general, does not stand up so well under the same conditions as in its solid state it is quite brittle.

The principal object of this invention therefore is to provide a method of forming a molded plastic anti-friction bushing in a machine element which does not require that the bushings be subjected to excessive pounding or end thrust.

A more specific object of this invention is to provide a method of uniting a bushing made of plastic material with a machine element wherein the formation of the bushing and its union with the element are accomplished simultaneously.

Another object of this invention is to provide a method of forming anti-friction bushings whereby the coefficient of friction of certain of the bushings may be varied and the different bushings may be made in a single unbroken run.

These and other objects and features of the invention will become apparent from the following description and the accompanying drawing which form a part thereof and in which:

Fig. 1 shows a gear into which has been incorporated a bushing made of a thermo-setting material;

Fig. 2 shows the gear and associated mechanism for forming the bushing, the mechanism being shown in its initial position; and Fig. 3 shows the gear and the bushing-forming mechanism in the final stage of the formation of the bushing.

Referring now to Fig. 1 there is illustrated as an example of a machine element to which this invention may be applied a gear 10 having a toothed outer periphery 11, a hub section 12 and a bushing 13. The bushing is retained within an aperture 14 in hub section 12, the surface of the aperture being left substantially in the state in which it is found after the opening has been drilled into the blank. No attempt is made to finish the opening 14 since a slightly roughened surface will provide more irregularities into which the bushing 13 may be forced and thus serve to restrain relative rotation between the bushing and hub.

Bushing 13 may be formed of a mixture of the type disclosed in the said Davis application and comprising a plastic or more particularly a thermosetting resin, an example of the latter being "Bakelite," into which has been incorporated a binder or filler such as asbestos, yarn, etc., and a lubricant such as graphite, lead, iron or bronze. For the practice of my invention the plastic and the lubricant are both preferably in powdered form and the filler is in any suitably divided form, and it will be apparent that the relative quantities of the plastic, the filler and the lubricant may be varied in order that a bushing having the qualities desired may be obtained. The coefficient of friction of the bushing, for example, may be controlled by varying the relative quantities of the materials in the mixture. The relative quantities of the materials are such, however, that in the finished bushing the particles of lubricant are dispersed throughout the plastic and the filler in general is inside the plastic body. As shown in Fig. 1, bushing 13 has been machined by grinding to the proper inside diameter to receive a shaft on which the gear is to be mounted.

Bushing 13 is formed by the following procedure:

The gear 10 is placed upon the bed 15 of a press or ram which may be operated hydraulically to reciprocate first a mold casing 16 relative to bed 15 and then a plunger or force 17. Mold casing 16 is enlarged at its lower end 18 to receive gear 10, said casing having a contour which fits closely the contour of the gear. Force 17 is comprised of a cylinder 19 which fits accurately into cylindrical opening 20 in mold casing 16, a section of reduced diameter 21, the length of which is substantially equal to the axial length of the opening 14 in gear 10, and a shoulder 22 which is of substantially the diameter of opening 14 and serves to form the upper end surface of the bushing.

With gear 10 placed upon bed 15, a measured quantity of the material mentioned above for forming the bushing, preferably a thermosetting plastic and which is designated as 24, is poured into opening 14 and will occupy substantially the space indicated in Fig. 2. Following the insertion of the material into opening 14, mold casing 16 is lowered and the force 17 is likewise lowered. Heat is then applied to the assembly including the casing 16, the force 17, the gear 10, the bed 15 and the material 24 for softening the material whereby the force moves through the material and forces it upwardly and sidewardly against the wall of the aperture 14. It will be observed that during the movement of force 17 into the gear, excess material is given an opportunity to escape into an annular chamber 23 formed by shoulder 22 in force 17. The assembly is heated further, if the material 24 is thermosetting as is preferable, and the assembly is allowed to cool in order to cause the material to set and when the material is sufficiently solidified to retain its shape, force 17 is raised, followed by the mold casing, leaving the gear 10 with a bushing of plastic material in place in the opening 14. The bushing may then be ground or otherwise suitably finished to size depending upon the type of filler used in the plastic material.

It will be observed that in the process above described, the gear itself constituted the cavity of the mold and that the bushing was formed directly against the inner surface of the gear so that when the bushing was finished a completely assembled gear and bushing were obtained. This represents a substantial economy in the formation of such gears since, were the bushing to be formed separately and then inserted as an entity into the gear, a number of additional steps and operations would be required in order to produce a finished gear. In addition it would be difficult to insert the bushing into the gear and apply a sufficient force to obtain the requisite frictional adherence between the bushing and gear without damaging the bushing itself since the material of the bushing does not withstand this type of working very well. When the bushing is formed directly in the gear itself, however, as in accordance with this invention, all forcing of the bushing into the gear is of course eliminated and furthermore the formation of the bushing against the relatively rough inner surface of the gear provides much greater resistance to relative rotation than would be possible were the two formed separately and then united. The coefficient of friction of the bushings may be varied by varying the relative quantities of the constituents of the bushing forming material, and it will be apparent that bushings having different coefficients of friction may be manufactured one after the other or a series of bushings having a certain coefficient of friction may be made in the same unbroken run with other bushings having a different coefficient of friction.

It is understood that the foregoing description is merely illustrative of a preferred embodiment of the invention, particularly as to the machine element to which the invention may be applied and the specific composition of the bushing material. The scope of this invention therefore should not be limited to the embodiment illustrated but should be determined by the appended claim.

I claim:

The method of forming a bushing in a bore in the hub of a machine element, said bore being open at both ends and being adapted to receive a shaft so that the machine element and bushing may rotate on the shaft, which method comprises placing the machine element on its side on a flat bed so that the latter closes one end of said bore, introducing into said bore a quantity of fusible material in powder form, introducing into said bore a plunger which is smaller in diameter than said bore and the axis of which is substantially coaxial with the axis of said bore, heating the material to fuse the same, forcing the plunger toward said bed to cause substantially all of the material in said bore to flow from under said plunger sidewardly and upwardly along the sides of the plunger to fill the space between said plunger and the walls of said bore, holding said machine element against said bed during movement of said plunger in the manner described and independently of the force applied to said plunger, causing the material to harden, and thereafter withdrawing said plunger from said bore.

WILLIAM C. SHRIVER, JR.